(12) United States Patent
Schulz et al.

(10) Patent No.: US 9,256,500 B2
(45) Date of Patent: Feb. 9, 2016

(54) PHYSICAL DOMAIN ERROR ISOLATION AND RECOVERY IN A MULTI-DOMAIN SYSTEM

(71) Applicant: Oracle International Corporation, Redwood City, CA (US)

(72) Inventors: Jurgen M. Schulz, Pleasanton, CA (US); Vishak Chandrasekhar, San Jose, CA (US); Wayne F. Seltzer, San Jose, CA (US); Brian J. McGee, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 247 days.

(21) Appl. No.: 13/861,917

(22) Filed: Apr. 12, 2013

(65) Prior Publication Data

US 2014/0310555 A1 Oct. 16, 2014

(51) Int. Cl.
*G06F 11/00* (2006.01)
*G06F 11/20* (2006.01)
*H04L 12/26* (2006.01)
*H04L 12/939* (2013.01)

(52) U.S. Cl.
CPC ........ *G06F 11/2002* (2013.01); *G06F 11/2007* (2013.01); *H04L 43/0823* (2013.01); *H04L 49/557* (2013.01)

(58) Field of Classification Search
CPC ............ G06F 11/2002; G06F 11/2007; H04L 49/557
See application file for complete search history.

(56) References Cited

U.S. PATENT DOCUMENTS

| | | | |
|---|---|---|---|
| 6,571,360 B1 * | 5/2003 | Drogichen et al. | 714/44 |
| 6,636,981 B1 * | 10/2003 | Barnett et al. | 714/4.5 |
| 7,010,740 B1 * | 3/2006 | Walton | 714/805 |
| 7,774,642 B1 * | 8/2010 | Johnsen et al. | 714/5.11 |
| 2003/0131213 A1 * | 7/2003 | Shanahan et al. | 711/203 |
| 2003/0152074 A1 * | 8/2003 | Hawkins et al. | 370/389 |
| 2010/0107015 A1 * | 4/2010 | Bernabeu-Auban et al. | 714/38 |

* cited by examiner

*Primary Examiner* — Yolanda L Wilson
(74) *Attorney, Agent, or Firm* — Park, Vaughan, Fleming & Dowler, LLP; Mark Spiller

(57) ABSTRACT

The disclosed embodiments disclose techniques for performing physical domain error isolation and recovery in a multi-domain system, where the multi-domain system includes two or more processor chips and one or more switch chips that provide connectivity and cache-coherency support for the processor chips, and the processor chips are divided into two or more distinct domains. During operation, one of the switch chips determines a fault in the multi-domain system. The switch chip determines an originating domain that is associated with the fault, and then signals the fault and an identifier for the originating domain to its internal units, some of which perform clearing operations that clear out all traffic for the originating domain without affecting the other domains of the multi-domain system.

20 Claims, 6 Drawing Sheets

PHYSICAL DOMAIN ERROR ISOLATION AND RECOVERY IN A MULTI-DOMAIN SYSTEM

BACKGROUND

1. Field of the Invention

This disclosure generally relates to the design of a semiconductor chip. More specifically, this disclosure relates to a semiconductor chip that serves as a coherence directory and switch chip for a set of processor chips in a multi-chip system.

2. Related Art

The proliferation of the Internet and large data sets has made data centers and clusters of compute servers increasingly common. Such compute servers typically include multiple processor chips that collaborate to provide increased computational capacity for one or more applications. For instance, processor chips in a multi-chip system may be partitioned into multiple, separate domains, where each domain can execute a different instance of an operating system with different applications and/or operate upon a different data set. Higher-level management software typically manages these domains.

As the number of processor chips in a system grows, the number of external communication channels that are available in each processor chip becomes a limitation, and the processor chips are configured to communicate using a separate set of shared communication components. Unfortunately, an error or failure in a shared component that is used by multiple domains can cause all of the domains to fail, thereby affecting the reliability, availability, and serviceability of those domains.

Hence, what is needed are structures and techniques for organizing groups of processor chips into domains without the above-described problems of existing techniques.

SUMMARY

The disclosed embodiments disclose techniques for performing physical domain error isolation and recovery in a multi-domain system, where the multi-domain system includes two or more processor chips and one or more switch chips that provide connectivity and cache-coherency support for the processor chips, and the processor chips are divided into two or more distinct domains. During operation, one of the switch chips determines a fault in the multi-domain system. The switch chip determines an originating domain that is associated with the fault, and then signals the fault and an identifier for the originating domain to its internal units, some of which perform clearing operations that clear out all traffic for the originating domain without affecting the other domains of the multi-domain system.

In some embodiments, signaling the fault further involves: (1) halting one or more single-domain units in the switch chip that are associated with the originating domain; and (2) performing the clearing operation in one or more multi-domain units in the switch chip that simultaneously handle traffic for multiple domains.

In some embodiments, halting single-domain units involves: halting one or more input queuing units (IQUs) that connect to processor chips that are associated with the originating domain; temporarily halting the input packet flow for one or more address switch receiving units (AXRIs) and address switch communicating units (AXCIs) during the clearing operation; halting output paths in one or more address switch output units (AXO) that connect to processor chips that are associated with the originating domain; and halting one or more output queuing units (OQUs) that connect to processor chips that are associated with the originating domain.

In some embodiments, performing the clearing operation for multi-domain units involves invalidating all of the requests that are associated with the originating domain in one or more address serialization units (ASUs) and invalidating any queued packets that are associated with the originating domain from the one or more AXOs. Note that each ASU handles requests from multiple domains, but can selectively clear out packet information and resources associated with the originating domain without affecting other domains in the multi-domain system.

In some embodiments, invalidating all of the requests that are associated with the originating domain from an ASU involves: invalidating all of the entries for the originating domain from an input request FIFO in the ASU; retiring all of the scoreboard entries for the originating domain from a scoreboard in the ASU; and invalidating and discarding any packets associated with the originating domain from a forward request generator (FRG) in the ASU.

In some embodiments, determining the originating domain involves determining that the fault is associated with a specific link between the switch chip and a processor chip, and using a table of link-to-domain mappings to determine that the link is associated with the originating domain.

In some embodiments, determining a fault for the multi-domain system comprises one or more of the following: detecting a timeout for an operation in a switch chip unit; detecting a malformed packet in the multi-domain system; detecting an unsupported packet in the multi-domain system; detecting an unexpected response from a processor chip in an ASU; and detecting a request from the originating domain for an address outside the bounds of the originating domain.

In some embodiments, timeouts for switch chip operations are configured such that a timeout interval for the AXO is less than a timeout interval for an ASU scoreboard, the timeout interval for an ASU scoreboard is less than a PCIe timeout interval, and the PCIe timeout interval is substantially less than a processor timeout interval. This timeout interval ordering facilitates detecting and clearing blockages in the multi-domain system such that a fault in the originating domain does not propagate errors to other domains nor become visible at the operating-system or CPU level of other domains.

In some embodiments, the switch chip detects a second fault in another domain (that is distinct from the originating domain). The switch chip simultaneously clears out all traffic for both the originating domain and the second domain without affecting the other domains of the multi-domain system.

Figure 1:
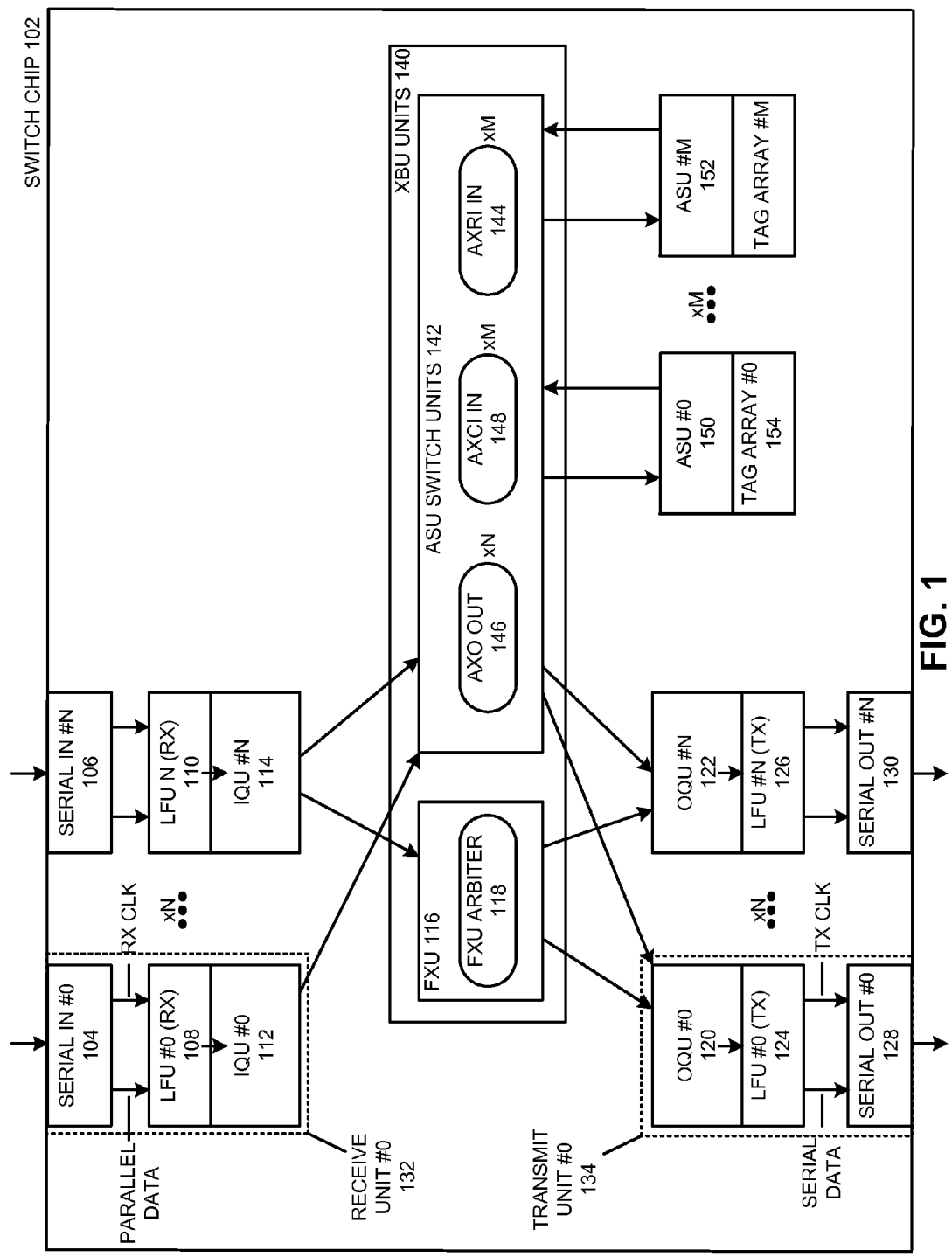
FIG. 1 illustrates the organization of an exemplary switch chip that manages communication and cache coherency for a set of connected CPUs in accordance with an embodiment.

Table 1 summarizes how each unit of a switch chip handles a CeaseOp for a specific domain in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Providing System Scalability Via Switch Chips

Compute servers typically include multiple processor chips that collaborate to provide increased computational capacity for one or more applications. In a system with a small number of processor chips, the processor chips can be configured to communicate with each other directly. However, in such an arrangement, the external communication capabilities of each processor chip (e.g., the number of pins and/or ports that are available for communication connections with other chips) become a limiting factor for the scalability of the system. Hence, larger multi-chip systems typically include "switch chips" that provide connectivity among a set of processor chips ("CPUs"). These switch chips facilitate communication among CPUs, and allow the number of CPUs in the system to scale beyond the number of external connections that are supported by individual CPUs. Switch chips can also provide directory-based cache-coherency support for the CPUs.

As the number of CPUs in a multi-chip system grows, some of these CPUs may be partitioned into multiple, separate domains, each of which executes different applications and/or operates upon different data sets. Higher-level management software typically manages these domains, but unfortunately provides no ability for hardware fault isolation among domains. For instance, for a set of CPUs that communicate using shared communication components, an error or failure in such a shared component may cause multiple domains to fail, thereby affecting the reliability, availability, and serviceability (RAS) of those domains.

Consider, for instance, a shared resource in a switch chip that is handling requests from a number of CPUs in different domains. This shared resource might, under certain workloads (e.g., due to traffic patterns), be primarily handling traffic for a single domain. If one of the CPUs in this domain were to fail (e.g., experience an error, and exceed a timeout interval due to a lack of response), traffic associated with that CPU could be held up in the switch chip. As a result, subsequent requests for other domains may be forced to wait for the shared resource, and also experience delays (e.g., timeout delays) due to the traffic from the first domain not clearing the shared resource properly. Hence, an issue in one domain could spill over to one or more additional domains that are also using the shared resource.

In some embodiments, a switch chip is configured to provide hardware fault isolation and seamless recovery for domains to provide a higher level of reliability, availability, and serviceability for multiple domains. More specifically, the switch chip is designed to provide hardware fault isolation and seamless recovery in multiple units depending on each unit's function, thereby ensuring that hardware faults in one domain cannot spread into other non-related domains and cause those domains to crash. For instance, traffic not related to a failed domain can still be processed while shared resources are cleared for the failed domain. After being cleared, a failed domain can be re-configured and can start using the shared resources again. Such capabilities can significantly increase the RAS capabilities of a multi-CPU system.

FIG. 1 illustrates an exemplary switch chip 102 that manages communication and cache coherency for a set of connected CPUs. Switch chip 102 receives data and requests via a set of N receiving units. For instance, a number of serial input units 104-106 may receive input in a high-speed serial format, convert the serial data to a lower-rate parallel format, and then forward this information to a receiving (RX) link framing unit (e.g., LFUs 108-110) that converts the raw data into packets (e.g., request packets, data packets, response packets, and programmed input/output (I/O) packets). These packets are then placed into an appropriate processing queue for a crossbar unit (XBU units 140) by an input queuing unit (e.g., IQUs 112-114) based on the packet type.

Some of the received packets are just passing through switch chip 102; the processing queues for these packets are forwarded by XBU units 140 to a forwarding switch unit (FXU 116), which includes switching capabilities. An arbiter (FXU arbiter 118) in FXU 116 forwards each of these packets to one of N transmit units. For instance, the packet may first be routed to an output queuing unit (e.g., OQUs 120-122) based on the target destination. A transmit (TX) link framing unit (e.g., LFUs 124-126) for the target OQU then converts the packet into raw data and passes this data on to a serial output unit (e.g., serial output units 128-130), which converts the data to a high-speed serial stream and transmits it to the target destination. Note that while the N receiving and transmit units are logically illustrated as separate units, each pair (e.g., receive unit #0 132 and transmit unit #0 134) may be implemented as a single combined hardware unit that sends and receives data from a given communications port.

Another set of processing queues for XBU units 140 route packets to switch units 142 for a set of M address serialization units (ASUs) 150-152. As mentioned previously, one or more switch chips 102 may provide directory-based cache-coherency capabilities for a set of CPUs. The address space for the multi-CPU system is partitioned across the set of switch chips such that each cache chip, and each ASU in each cache chip, serves as a directory for a distinct set of cache lines. Cache misses in each CPU are routed to the appropriate switch chip (based on the requested memory address), where the appropriate (also based on the requested memory address) ASU performs a lookup in its local tag array to determine the status of the requested cache line. If the ASU determines that the requested cache line is being cached in another CPU, the ASU can send a request to the caching CPU to send the cache line to the requesting CPU, and then update its tag array to indicate that the cache line is now also being cached (e.g., shared) by the requesting CPU. If the requesting CPU is requesting exclusive access to the requested cache line, the ASU can determine the set of CPUs currently caching the cache line, and perform the appropriate actions. For example, the ASU may initiate a cache-to-cache transfer that clears the cache line from a caching CPU and forwards it to the requesting CPU, thereby ensuring that the cache line always stays in caches (instead of being cleared from a cache, and then reloaded from memory, which would involve additional delay). Furthermore, the ASU may send invalidation requests for the cache line to one or more other CPUs that are caching the cache line. Hence, each ASU in general tracks where its subset of data is cached, and sends instructions (e.g., packets) that forward this cached data throughout the multi-CPU system as needed. Note, however, that while the ASUs track where cache lines are stored, and can send requests that adjust cache contents, the ASUs do not actually store cache lines.

In the context of FIG. 1, a portion of the address space for the system is partitioned across the ASUs 150-152 of switch chip 102, with ASUs 150-152 handling requests for their respective allocated portion of the address space. A CPU experiencing a cache miss in this address range sends a cache request to switch chip 102; this request packet is routed by an IQU to XBU units 140 and ASU switch units 142. ASU switch units 142 route the request to the specific address switch receiving unit (AXRI IN) 144 that handles requests for the ASU (e.g., ASU #0 150) that handles the address range for the requested cache line. This ASU looks up the requested cache line in its tag array (e.g., tag array #0 154), and generates an outgoing packet with the necessary instructions needed to fulfill the cache request. This instruction packet is sent to one of N address switch output units (AXO OUT 146), which transfers it to an appropriate OQU (e.g., one of OQUs 120-122) based on the target destination for the instruction packet (e.g., a specific CPU in the multi-CPU system).

The ASU switch units 142 may also receive responses to requests that were generated by the ASUs 150-152 (e.g., an acknowledgment, or the requested cache line in implementations where CPUs receiving requests send requested data back via the requesting ASU and switch chip). Such response packets are routed from the IQUs (112-114) to ASUs 150-152 via a set of M AXCI switch units (e.g., AXCI IN 148).

Note that some implementations of switch chips may include credit-based interfaces between the buffers of each unit. For instance, a transmitting unit may know the amount of buffer space in the next unit, and will only send that amount of packets (e.g., "using up its credits"). When the next unit has processed its requests, it signals a set of credits back to the transmitting unit to allow an additional set of packets to be transmitted. Such credit-based interfaces facilitate managing traffic flow (and avoiding overloaded buffers) without having to include dedicated flow-control signals in the implementation. Note that buffers are typically sized based on an expected round-trip latency between two communicating units. External interfaces that communicate with units that are external to the switch chip may have larger buffers, due to off-chip latencies typically being larger than on-chip latencies.

Figure 2:
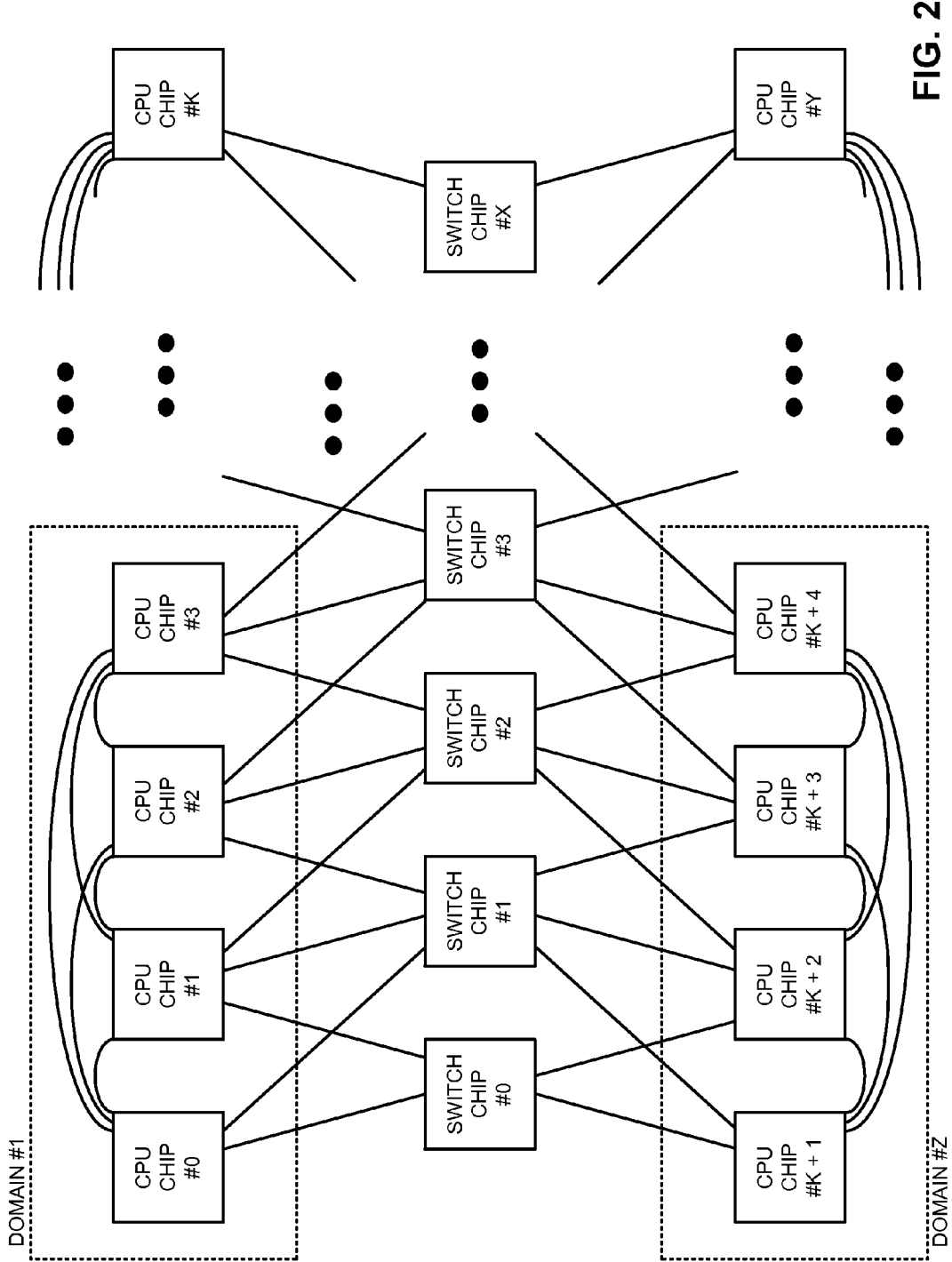
FIG. 2 illustrates an exemplary system in which multiple switch chips are used to facilitate communication and cache coherency among multiple CPUs in accordance with an embodiment.

FIG. 2 illustrates an exemplary system in which multiple switch chips (e.g., of the type illustrated in FIG. 1) are used to facilitate communication and cache coherency among multiple CPUs. Note that each CPU may include multiple processor cores and cache levels, and be associated with its own memory (not shown); the collective memories associated with the set of CPUs are shared across the system in a non-uniform memory access architecture (e.g., where processors can access their local memory faster than non-local memory). Note that the number of switch chips needed and the topology for the CPUs and switch chips may depend on a range of factors that include, but are not limited to: the number of CPUs in the system; the number of communication ports on each CPU; the number of communication ports on each switch chip; a desired level of connectivity and link redundancy; the number and directory sizes of the ASUs on each switch chip, and the overall size of the caches and memory address space (e.g., the number of ASUs in a switch chip may be decided based on an expected request lookup bandwidth and physical implementation limitations, such as the area needed by the RAM for each ASU); and/or the layout of chips and switch chips across physical boards in a server design (and the physical space available for routing links). Similarly, the number of domains in the system, and the number of CPUs in each domain, may also vary based on a number of factors.

Some system architectures may have each CPU only connect to one or more switch chips. In other system architectures, however, CPUs may be linked with both switch chips and other CPU chips (e.g., as illustrated in FIG. 2). In some systems, switch chips may also be linked to other switch chips. For example, there may not be sufficient communications ports on each switch chip to connect to all of the CPUs in the system; hence, some cache requests from a given CPU may follow a multi-hop path that traverses multiple CPUs and/or switch chips. Furthermore, the links between CPUs and switch chips may be organized in a manner that provides multiple redundant paths between each CPU and switch chip (e.g., in case of link failures). Depending on the partitioning of the system address space, CPUs in a given domain may be configured to access either a subset or the complete set of switch chips (e.g., the address range may be effectively partitioned for each domain).

Consider, for instance, an exemplary system that includes 32 processor chips and 12 switch chips, where each of these switch chips has 8 ASUs and 24 communications ports (e.g., M=8 and N=24; however, some of the communications ports on one or more switch chips might not be used). Each CPU is logically connected with every switch chip (either directly or via a multi-hop route), and the address space for the system is statically partitioned across the 96 ASUs. Each CPU is configured to determine which switch chip to contact based on the address of a desired cache line, and the ASU switch units in each switch chip guide specific request packets to the correct ASUs, which then issue the instructions needed to ensure that the requesting CPUs receive the needed cache data.

In some implementations, CPUs are aware of the address range for their respective domain, but are not specifically aware of being in a domain, or the presence of other domains (or even sometimes of other CPUs). From the CPU perspective, each CPU is operating on data in a given memory address range, submitting requests for addresses in this memory range (which are then routed to an appropriate switch chip), and then receiving the requested data. Some higher-level processor and/or process configures the domains, and each domain may be configured to run a different instance of an operating system (and/or different operating systems).

Hardware Fault Isolation and Recovery

In a multi-domain system that does not provide fault isolation, an error or fault in one domain may spread to multiple domains (or even all of the domains), thereby potentially corrupting (and/or undoing) the work done by some or all of the CPUs in the system. Sources of faults may vary, and include (but are not limited to) one or more of the following:
  a malformed packet (e.g., a frame that cannot be decoded into a packet in the supported packet protocol specification, perhaps because of a protocol violation or a multi-bit error);
  an unsupported packet (e.g., a packet that is defined in the packet protocol specification but is not implemented and/or supported, or a type of packet that should not be received by a specific unit);
  a request for an address outside of a CPU's domain (e.g., a request from a CPU for a memory address that should not be accessible by the CPU's domain);
  an unexpected response to an ASU request (e.g., an unexpected acknowledgment of a non-existent request, or notification of an error in servicing a request); and/or
  a request exceeding a specified timeout interval for some reason.

In some embodiments, a switch chip is configured to ensure that corrupt packets and/or requests are not propagated among domains. For instance, multiple units in a switch chip may be configured to perform checks and react to issues in a manner that ensures hardware fault isolation. For example, a link frame unit receiving packets will typically check that the received packets are valid, and that cache line requests received from a given CPU access valid memory addresses in that CPU's domain. Any unit of a switch chip that determines an issue signals a fault, after which each switch chip in the system needs to clear any resources that are being consumed by the faulty domain.

However, different units in a switch chip have different characteristics and different levels of resource sharing. Hence, each unit may need to handle faults differently depending on whether the unit is handling traffic only for a single domain or might be simultaneously handling traffic for multiple domains. For instance, consider the units described for the exemplary switch chip of FIG. 1:
  The IQUs: Each IQU is (physically) connected to exactly one CPU. If each CPU can only be in one domain, this means that each individual IQU is in a single domain (e.g., is a "single-domain unit"). Hence, if a problem is detected for a domain that includes the CPU connected to a given IQU, a "CeaseOp" (e.g., a signal to stop traffic flow) can be sent to that IQU, effectively ceasing communication on the link. Note that halting this IQU will only affect the faulty domain, not any of the other domains in the system.
  The FXU: The FXU is essentially an N-way switch that forwards traffic, and is connected to the IQUs and OQUs of the switch chip. Each of the N ports of this N-way switch is part of one domain. The FXU does not need to be halted if the link from a given CPU is disabled by a CeaseOp; it will automatically stop forwarding traffic from that CPU, because the link supplying such traffic (the IQU receiving traffic from that CPU) has already been halted (and/or because of a lack of send credits for that IQU, if a credit-based technique is used to provide flow control for the stopped link). Hence, the FXU is also effectively a single-domain unit.
  The AXRI and AXCI inputs: the inputs and outputs of the AXRI and AXCI units are considered separately (e.g., the outputs are described in a following bullet). The inputs, which receive and route incoming traffic to the ASUs, can distinguish incoming traffic by domain, and hence are considered a single-domain unit (e.g., the inputs can drop traffic received for that domain). However, each AXRI (and AXCI) input may stop forwarding all traffic to its associated ASU for a given interval, as the ASUs go through a clearing operation that removes the state of the failed domain (described in more detail below). Note that once this clearing operation begins, the ASUs will not expect any further packets from the failed domain (until it has been completely recovered and restarted); hence, the input units should be halted as quickly as possible (e.g., within a few cycles of detecting a fault).
  The ASUs: each ASU receives requests from all of the domains in the system. The resources for the faulty domain need be cleared; e.g., if any one CPU in a domain sends malformed packets, the entire domain needs to be shut down, and all of the directory information for that domain needs to be cleared from all of the ASUs of all of the switch chips (in parallel). However, the directory information for all of the other domains needs to be preserved. Thus, the ASUs are considered "multi-domain" units, and continue operating normally after the faulty domain's resources have been cleared.
  The AXRI and AXCI outputs: the AXRI and AXCI outputs receive packets destined for all CPUs and domains from the ASUs, and hence are considered multi-domain units. The AX*I outputs continue running, but because the ASU clearing operation invalidates all requests for the faulty domain in its request buffers (as described below), the AX*I outputs can continue to output the traffic for the other domains without fear of propagating faults from the faulty domain.
  The AXO inputs: the inputs and outputs of the AXO units are also considered separately. The inputs of the AXO units receive packets destined for multiple domains from the ASUs, and hence are considered multi-domain units. The AXO units may have some packets queued up for a domain that is going into CeaseOp, and hence need to ensure that such packets are cleared. The links for a faulty domain will typically have already been CeaseOp'd (e.g., halted), so the clearing process for the AXO units involves inspecting their buffers for any requests destined for such domains, and invalidating such packets. After packets for the faulty domain have been discarded from the input queue, the AXO unit can continue to operate normally (e.g., sending request traffic for other domains).

The AXO outputs and OQUs: Each AXO output and OQU is associated with exactly one CPU, and hence, as for the IQUs, are single-domain units. More specifically, the AXO outputs and OQUs associated with a faulty domain can be halted, while the AXO outputs and OQUs associated with non-faulty domains can continue to operate normally.

TABLE 1

| Unit | CeaseOp Class | CeaseOp Type | Reset Type | Action for CeaseOp |
|---|---|---|---|---|
| IQU | single | link | link | Link is down; halt packet flow (within x cycles) |
| FXU | single | | link | Continue operation (packets from faulty link will eventually halt due to lack of credits) |
| AX*I (input) | single | link | link | Halt packet flow (within x cycles); stop requesting to output link |
| AX*I (output) | multi | | | Continue operation |
| ASU | multi | domain | | Continue operation; for CeaseOp domain, perform clearing operation (described below) |
| AXO (input) | multi | link | | Continue operation; for CeaseOp link, invalidate & discard all packets in input queues that are destined to that output link |
| AXO (output) | single | | link | Continue operation |
| OQU | single | link | link | Link is down; halt packet flow |

Table 1 summarizes how each unit handles a CeaseOp for a specific domain. Single-domain units (such as the IQU) can be selectively disabled to stop sending packets on a per-CPU basis for the set of CPUs that are part of a faulty domain. Multi-domain units (such as the ASU) continue operation for the set of domains that are not faulty after clearing resources for any faulty domains.

Detecting and Reporting Errors

In some embodiments, isolating errors to individual domains involves detecting a fault and flagging an appropriate CeaseOp. For instance, depending on where in a switch chip an error is detected, a detecting unit may initiate either a domain CeaseOp or a link CeaseOp. For example, an OQU may determine that its queue is not making progress, determine that its output link has failed (e.g., by detecting a multi-bit error, protocol violation, illegal address outside of the domain, etc.), and then flag a CeaseOp for that link, thereby effectively ceasing communication on that link. Another alternative example involves detecting a link failure via a timeout in a switch; upon detecting that an outgoing packet is effectively stuck (e.g., hasn't been sent for some time interval, perhaps due to a hardware fault in the credit management system that provides flow control for the link), an AXO switch may also determine that an output link is not properly sending packets, and flag a CeaseOp for that link. An event-reporting hierarchy translates a received link CeaseOp into (potentially) a multi-link CeaseOp and a single domain CeaseOp, which in turn lead to a set of halts and clearing operations for all (or, potentially, in some scenarios and/or implementations, a subset) of the multi-domain units.

Consider another example, this time for a domain CeaseOp. A request that is sent by a CPU and received by an ASU is tracked in a "scoreboard" that keeps track of all outstanding requests and ensures that the requests complete successfully. The ASU generates a set of instructions to other CPUs (based on the nature of the request), and then tracks the set and timeframe of expected responses in the scoreboard. The ASU determines whether an expected response is not received within a certain timeframe, and if so, flags the missing response as a request timeout and triggers a CeaseOp for the domain that generated the request.

Figure 3:
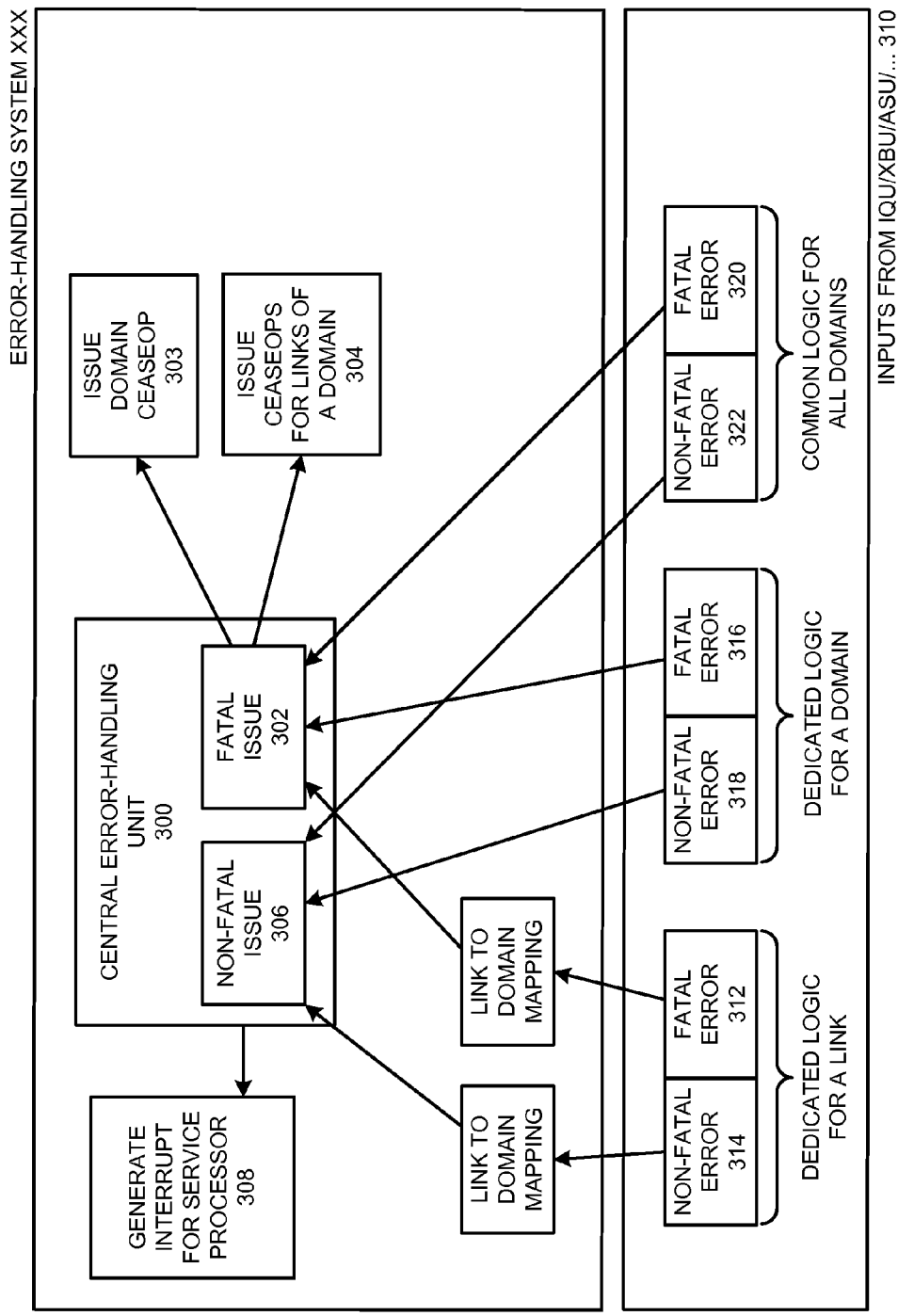
FIG. 3 illustrates an exemplary error-reporting system for a switch chip in accordance with an embodiment.

FIG. 3 illustrates an exemplary error-reporting system for a switch chip. A central error-handling unit 300 collects information from all of the units of the switch chip 310. As mentioned above, errors may be detected at the scope of a specific link or at the scope of a domain. Each unit may also determine whether an error is fatal or non-fatal. Consider first the error handling for the dedicated logic for a link. The link logic determines whether an error is fatal 312 or non-fatal 314. The reported error goes through a link-to-domain mapping that maps the link to a specific domain (e.g., the system maintains mappings of links to domains, as well as domains to links), and is then reported to central error-handling unit 300. In the case of a fatal error 312, central error-handling unit 300 responds to the fatal issue 302 by initiating a domain CeaseOp for that domain 303 and as well as appropriate link CeaseOps for all of the links in that domain 304. Note that the domain CeaseOp is broadcast to the appropriate units on the switch chip (which take the appropriate actions, as described above), and may also be broadcast to other switch chips and/or CPUs in the system. In scenarios with link failures, another switch chip not receiving a failure message due to a failed link is also likely to detect the failed link and initiate a fatal error for the domain, thereby still propagating the fact that the domain needs to be halted.

The dedicated logic for multi-domain units can directly determine a domain involved in an error, and hence does not need to go through a link-to-domain mapping. Instead, the dedicated logic directly reports a fatal 316 or non-fatal 318 error for a domain to central error-handling unit 300, which as before (in the case of a fatal error 316) can initiate a domain CeaseOp 303 and appropriate link CeaseOps 304. In some instances, an error (e.g., a fatal error 320 or a non-fatal error 322) may be raised by common logic that handles all domains, or a fatal error may be detected that cannot be mapped to a specific domain; such situations typically trigger a fatal error for all domains, thereby effectively stopping the entire multi-CPU system. In general, switch chip implementations strive to minimize such common logic and indeterminate-domain errors as much as possible, because of these consequences. For instance, an ASU scoreboard may include special error-correcting code (ECC) checksum fields that protect a number of bits of information for each transaction held in the scoreboard (e.g., protecting the address, request type, associated domain, and other information). Note that if a single checksum were used to protect all of this information, data corruption in the checksum or the checksummed information could lead to uncertainty of the source domain, which could lead in turn to a CeaseOp for all of the domains. Hence, some implementations may include two or more checksums, where one checksum covers the bits which determine the cluster (e.g., the domain) to which the request belongs, and one or more additional checksums cover the other information. In such an implementation, situations in which the domain bits or domain checksum are corrupted would still lead to all of the domains being stopped, but corruption for any of the other bits would only result in a CeaseOp for a single domain.

Central error-handling unit 300 seeks to ensure that any potential data corruption does not reach persistent storage (e.g., the I/O subsystem for the multi-CPU system). Central error-handling unit 300 gathers information for non-fatal issues 306, and can then send an interrupt to a service processor 308, which may look at system state to determine potential issues and reconfiguration options. Similarly, in the case of a fatal issue 302, central error-handling unit 300 attempts to capture enough information to identify the source of the fault, in the hopes that a service processor can determine how to remedy the fault and continue to use the resources of the halted domain. For instance, upon determining that one CPU is causing a large number of errors, the service processor may disable that CPU and restart the domain without the faulty hardware (e.g., the restarted domain will have one less CPU). Alternatively, if the service processor determines that the source of the problem is a given memory associated with a CPU, it may take the memory offline and restart the domain (e.g., leaving the CPU associated with the faulty memory operational, but having it load its cache via other CPU's caches and/or memories). In one more example, if the service processor determines that the source of the problem is a given link between a CPU and another CPU or switch chip, the service processor may disable this link, and have the chips communicate via another redundant or multi-hop link.

In some embodiments, ensuring domain isolation involves clearing out resources in switch chip units before CPUs can detect a problem. In some switch chip implementations, this involves using a set of ordered timeouts to ensure that errors are resolved with minimal disruption and propagation. For instance, consider a set of timeouts for an AXO switch and an ASU scoreboard. An AXO switch (in the XBU unit, as illustrated in FIG. 1) that is handling ASU packets may include a timeout for any packet that is being sent to an output port. These AXO timeouts prevent an error (in one domain) from backing up the AXO and eventually the ASU. The ASU scoreboard implements timeouts for all of the transactions that it generates and for which it expects additional completion and/or response packets. When a timeout occurs for one of these transactions, the ASU logs relevant data (e.g., into a central error-code register) and clears the scoreboard entry. The AXO timeout interval may be configured to be shorter than the ASU timeout interval, to allow the packet flow a chance to clear before the ASU detects a timeout; otherwise, the ASU may erroneously detect a timeout in an unrelated domain. Furthermore, having the AXO time out before the ASU facilitates clearing stuck packets from the AXO's input queues (and returning internal flow-control credits to the ASU). For example, a hierarchy of timeouts in the system may be configured as:

AXO timeout<ASU timeout<PCIe Timeout<<CPU timeout (where PCIe is a peripheral component bus used to access I/O devices). In general, a fatal error for a domain will typically result in the domain crashing (e.g., being halted, cleared, possibly reconfigured, and restarted), but choosing appropriate timeout intervals can speed up the process of detecting and clearing blockage so that other domains can carry on processing using the shared resources. PCIe and CPU timeouts are visible at the operating-system level; having shorter AXO and ASU timeouts facilitates temporarily ceasing operation, clearing blocked resources, and resuming operation before the operating systems and CPUs of other domains time out, thereby ensuring that timeouts do not propagate among domains. Note that individual switch chip units may still see brief blockage and/or delays, but any blocks should be quickly cleared.

Clearing ASUs

During a domain CeaseOp, each ASU needs to clear any requests for any domains that are being reset. CeaseOps may be signaled using a multi-bit bus, where each bit represents a domain. Once a CeaseOp signal is received, an ASU initiates a hardware domain reset process (illustrated in FIG. 4A) that clears all of the requests for any specified domains from the ASU. Structures in the ASU are cleared in order from unit input to output, to insure that a request does not miss being cleared. First, the ASU clears all entries for a failed domain from its input request FIFO (IRF) (operation 400), which is a first-in, first-out (FIFO) buffer between the AXRI and ASU that holds requests coming into the ASU from the AXRI switch. Next, the ASU clears out its scoreboard of any entries associated with the failed domain (operation 410). Then, the ASU clears any packets related to the failed domain from the forward request generator (FRG) (operation 420), which generates (and queues) requests from the ASU to the CPUs (e.g., requesting cache lines, etc). All of the packets for the faulty domain are detected and invalidated (e.g., discarded) during this process. As mentioned previously, the AXRI and AXCI inputs to the ASU are halted prior to the clearing operation to ensure that no new packets for the failed domain can enter the ASU as it clears. Hence, after the clearing operation has completed, the system is assured that all of the packets for the failed domain have been purged from the ASU. After all of the requests for a domain have been cleared from the ASU, a service processor can reset the directory for each CPU in that domain.

In some embodiments, during each step of the clearing process, an ASU may cycle through a "cluster-to-domain" table (illustrated in FIG. 4B) that maps CPU identifiers to specific domains. When the domain of an entry in the table matches a current domain undergoing CeaseOp, a clear signal and a CPU identifier are provided to the structure being cleared. In such implementations, the structures are cleared on a CPU-by-CPU basis. Note that the clearing process may include an additional delay after the last CPU in the table is checked and the process proceeds to the next clearing state, to allow any in-flight transactions which may have been missed to reach the next structure (where they will then subsequently be cleared). Note also that some implementations may prevent any requests from being installed in the ASU scoreboard during a CeaseOp to prevent any race conditions that are related to invalidating a request in the scoreboard, installing a new request in the same scoreboard entry, and then receiving indication of that scoreboard entry being processed by the FRG.

Figure 4A:
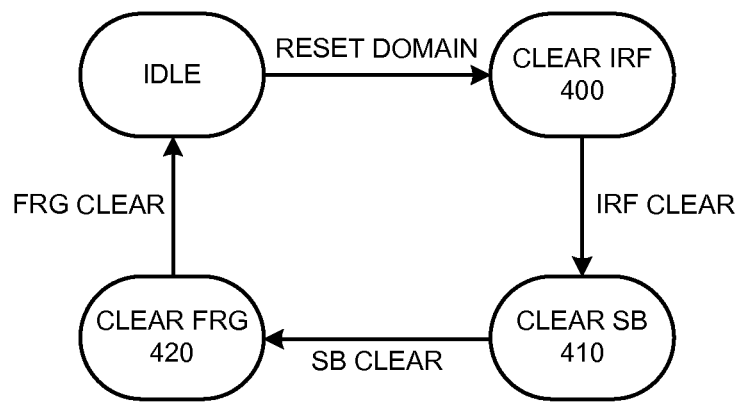
FIG. 4A presents a flow chart that illustrates a hard domain reset process for an ASU in accordance with an embodiment.
Figure 4B:
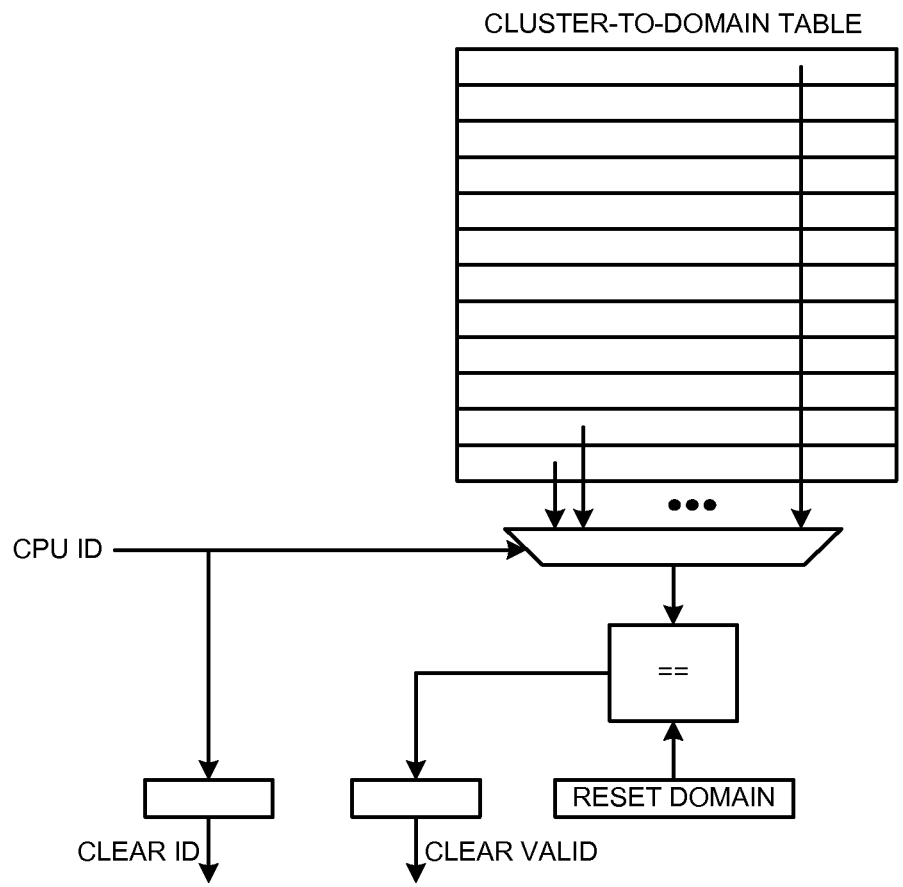
FIG. 4B illustrates a cluster-to-domain table that maps CPU identifiers to domains in accordance with an embodiment.

Note that multiple domains may have errors (and hence trigger CeaseOps) at the same time, and as a result each ASU may need to perform the clearing operation illustrated in FIG. 4A for each domain that is experiencing a CeaseOp. For instance, the clearing process may involve going through the above-described clearing process one domain at a time, clearing out packets for each CPU in that domain before moving on to the next domain. Alternatively, the clearing process may process all of the packets for all of the failed domains in each stop of the process (of FIG. 4A), thereby only going through the clearing operations once for the multiple failed domains. Note that each unit may include logic that tracks the domains that have been cleared, and prevents those domains from being cleared again, until after the CeaseOp signal for that domain has been de-asserted again.

Figure 5:
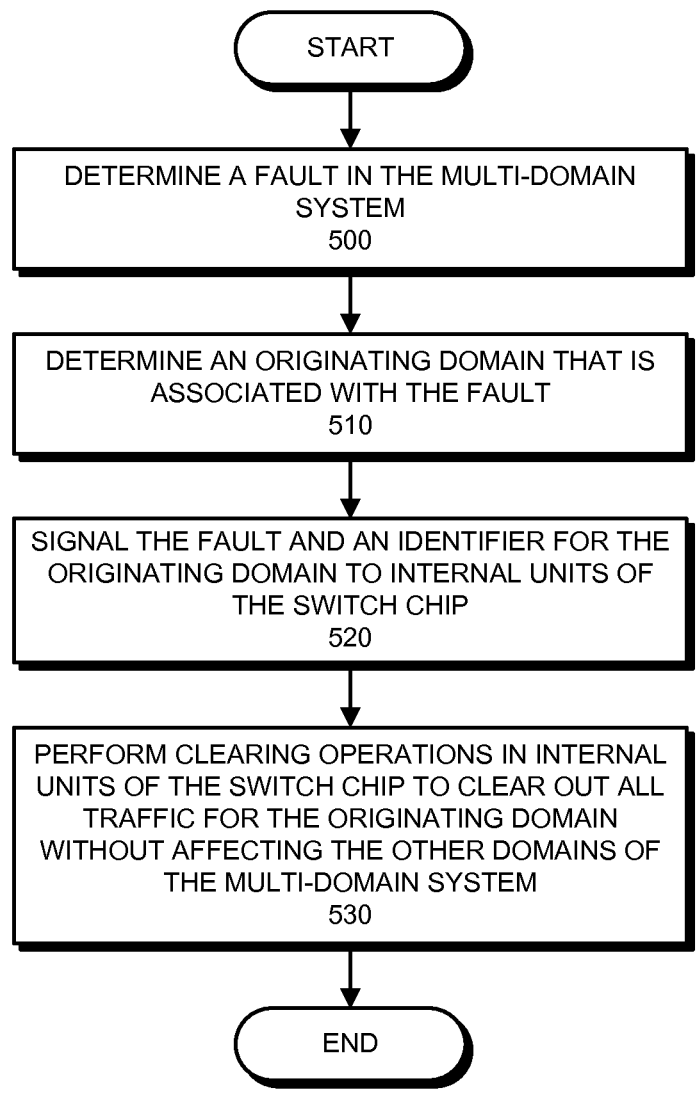
FIG. 5 presents a flow chart that illustrates the process of performing physical domain error isolation and recovery in accordance with an embodiment.

FIG. 5 presents a flow chart that illustrates the process of performing physical domain error isolation and recovery in a multi-domain system, where the multi-domain system includes two or more processor chips and one or more switch chips that provide connectivity and cache-coherency support for the processor chips, and the processor chips are divided into two or more distinct domains. During operation, one of the switch chips determines a fault in the multi-domain system (operation 500). The switch chip determines an originating domain that is associated with the fault (operation 510), and then signals the fault and an identifier for the originating domain to its internal units (operation 520), some of which perform clearing operations that clear out all traffic for the originating domain without affecting the other domains of the multi-domain system (operation 530).

In summary, embodiments of the present invention comprise techniques for providing physical domain error isolation and recovery in a multi-domain system that includes multiple processor chips that are divided into two or more distinct domains. One or more switch chips provide connectivity and cache-coherency support for these processor chips, and include a set of structures that ensure that faults are compartmentalized into an originating domain (e.g., do not propagate to and interfere with other domains in the multi-domain system, thereby improving the reliability, availability, and serviceability of the other domains). For instance, a switch chip may: (1) disable individual single-domain structures that are associated with the originating domain; and (2) allow multi-domain structures to continue operation for the set of domains that are not faulty after clearing any resources used by the originating domain.

Computing Environment

Figure 6:
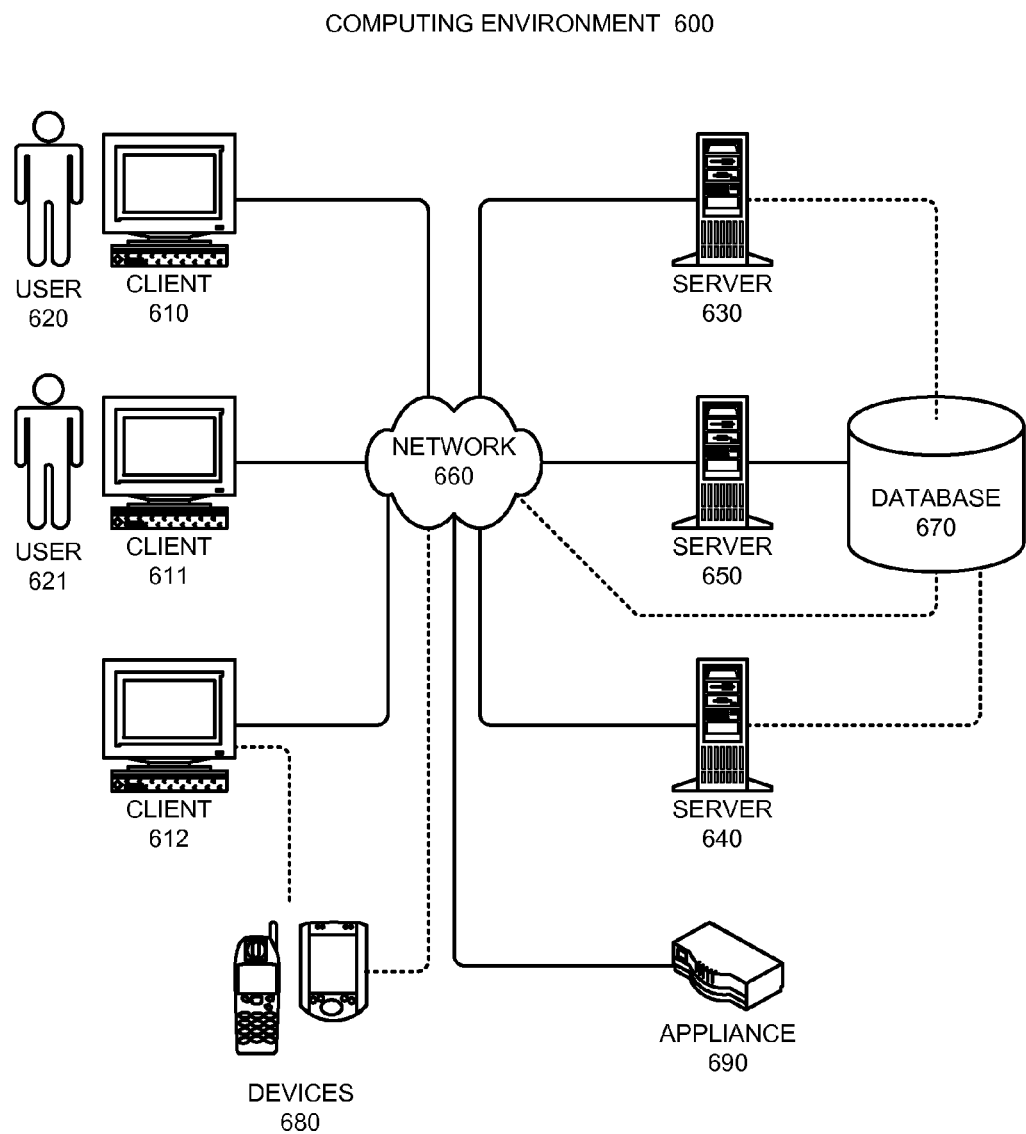
FIG. 6 illustrates a computing environment in accordance with an embodiment.

In some embodiments of the present invention, physical domain error isolation and recovery functionality can be incorporated into a wide range of computing devices in a computing environment. For example, FIG. 6 illustrates a computing environment 600 in accordance with an embodiment of the present invention. Computing environment 600 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 6, computing environment 600 includes clients 610-612, users 620 and 621, servers 630-650, network 660, database 670, devices 680, and appliance 690.

Clients 610-612 can include any node on a network that includes computational capability and includes a mechanism for communicating across the network. Additionally, clients 610-612 may comprise a tier in an n-tier application architecture, wherein clients 610-612 perform as servers (servicing requests from lower tiers or users), and wherein clients 610-612 perform as clients (forwarding the requests to a higher tier).

Similarly, servers 630-650 can generally include any node on a network including a mechanism for servicing requests from a client for computational and/or data storage resources. Servers 630-650 can participate in an advanced computing cluster, or can act as stand-alone servers. For instance, computing environment 600 can include a large number of compute nodes that are organized into a computing cluster and/or server farm. In one embodiment of the present invention, server 640 is an online "hot spare" of server 650. In other embodiments, servers 630-650 include coherent shared-memory multiprocessors.

Users 620 and 621 can include: an individual; a group of individuals; an organization; a group of organizations; a computing system; a group of computing systems; or any other entity that can interact with computing environment 600.

Network 660 can include any type of wired or wireless communication channel capable of coupling together computing nodes. This includes, but is not limited to, a local area network, a wide area network, or a combination of networks. In one embodiment of the present invention, network 660 includes the Internet. In some embodiments of the present invention, network 660 includes phone and cellular phone networks.

Database 670 can include any type of system for storing data in non-volatile storage. This includes, but is not limited to, systems based upon magnetic, optical, or magneto-optical storage devices, as well as storage devices based on flash memory and/or battery-backed up memory. Note that database 670 can be coupled: to a server (such as server 650), to a client, or directly to a network.

Devices 680 can include any type of electronic device that can be coupled to a client, such as client 612. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 680 can be coupled directly to network 660 and can function in the same manner as clients 610-612.

Appliance 690 can include any type of appliance that can be coupled to network 660. This includes, but is not limited to, routers, switches, load balancers, network accelerators, and specialty processors. Appliance 690 may act as a gateway, a proxy, or a translator between server 640 and network 660.

Note that different embodiments of the present invention may use different system configurations, and are not limited to the system configuration illustrated in computing environment 600. In general, any device that includes multiple processor chips that can be split into multiple domains and communicate using a switch chip may incorporate elements of the present invention.

In some embodiments of the present invention, some or all aspects of physical domain error isolation and recovery functionality can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a processor can include one or more specialized circuits or structures that support physical domain error isolation and recovery functionality. Alternatively, operations that facilitate physical domain error isolation and recovery functionality may be performed using general-purpose circuits that are configured using processor instructions.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing physical domain error isolation and recovery in a multi-domain system, the method comprising:
   in a switch chip that provides connectivity and cache-coherency support for two or more processor chips, determining a fault for the multi-domain system, wherein the multi-domain system comprises the processor chips and the switch chip, and wherein the processor chips are divided into two or more distinct domains;
   determining an originating domain of the multi-domain system that is associated with the fault;
   signaling the fault and an identifier for the originating domain to one or more units in the switch chip; and
   performing a clearing operation in one or more units of the switch chip that clears out all traffic for the originating domain without affecting the other domains of the multi-domain system, wherein performing the clearing operation comprises:
      invalidating all requests for cache lines for the originating domain that are queued at the switch chip; and
      invalidating all packets queued at the switch chip that are destined for or originating from the originating domain.

2. The computer-implemented method of claim 1, wherein signaling the fault and the identifier for the originating domain to one or more units in the switch chip further comprises:
   halting one or more single-domain units in the switch chip that are associated with the originating domain; and
   performing the clearing operation in one or more multi-domain units in the switch chip, wherein a multi-domain unit simultaneously handles traffic for multiple domains in the multi-domain system.

3. The computer-implemented method of claim 2, wherein halting one or more single-domain units in the switch chip further comprises:
   halting one or more input queuing units (IQUs) that connect to processor chips that are associated with the originating domain;
   temporarily halting the input packet flow for one or more address switch receiving units (AXRIs) and address switch communicating units (AXCIs) during the clearing operation;
   halting output paths in one or more address switch output units (AXO) that connect to processor chips that are associated with the originating domain; and
   halting one or more output queuing units (OQUs) that connect to processor chips that are associated with the originating domain.

4. The computer-implemented method of claim 3, wherein performing the clearing operation for one or more multi-domain units in the switch chip further comprises:
   invalidating all of the requests that are associated with the originating domain in one or more address serialization units (ASUs); and
   invalidating any queued packets that are associated with the originating domain from the one or more AXOs.

5. The computer-implemented method of claim 4, wherein each ASU is a single unit that handles requests from multiple domains for the multi-domain system but can selectively clear out packet information and resources associated with the originating domain without affecting other domains in the multi-domain system.

6. The computer-implemented method of claim 4, wherein invalidating all of the requests that are associated with the originating domain in one or more ASUs further comprises:
   invalidating all of the entries for the originating domain from an input request FIFO for an ASU;
   retiring all of the scoreboard entries for the originating domain from a scoreboard in the ASU; and
   invalidating and discarding any packets associated with the originating domain from a forward request generator (FRG) in the ASU.

7. The computer-implemented method of claim 4, wherein determining the originating domain of the multi-domain system that is associated with the fault comprises:
   determining that the fault is associated with a specific link between the switch chip and a processor chip; and
   using a table of link-to-domain mappings to determine that the link is associated with the originating domain.

8. The computer-implemented method of claim 4, wherein determining the fault for the multi-domain system comprises detecting a timeout for an operation in a switch chip unit.

9. The computer-implemented method of claim 8,
   wherein the timeouts for switch chip operations are configured such that a timeout interval for the AXO is less than a timeout interval for an ASU scoreboard, the timeout interval for the ASU scoreboard is less than a PCIe timeout interval, and the PCIe timeout interval is substantially less than a processor timeout interval; and
   wherein this timeout interval ordering facilitates detecting and clearing blockages in the multi-domain system such that the fault in the originating domain does not propagate errors to other domains nor become visible at the operating-system or CPU level of other domains.

10. The computer-implemented method of claim 4, wherein determining the fault for the multi-domain system comprises detecting a malformed packet in the multi-domain system.

11. The computer-implemented method of claim 4, wherein determining the fault for the multi-domain system comprises detecting an unsupported packet in the multi-domain system.

12. The computer-implemented method of claim 4, wherein determining the fault for the multi-domain system comprises detecting an unexpected response in an ASU.

13. The computer-implemented method of claim 4, wherein determining the fault for the multi-domain system comprises detecting a request from the originating domain for an address outside the bounds of the originating domain.

14. The computer-implemented method of claim 4, wherein the method further comprises:
   detecting a second fault in a second domain of the multi-domain system that is distinct from the originating domain; and
   simultaneously clearing out all traffic for both the second domain and the originating domain without affecting the other domains of the multi-domain system.

15. A multi-domain system, comprising:
   two or more processor chips; and
   a switch chip,
   wherein the switch chip includes internal structures that provide connectivity and cache-coherency support for the processor chips;

wherein the processor chips are divided into two or more distinct domains; and wherein the switch chip is configured to:
- determine a fault for the multi-domain system;
- determine an originating domain of the multi-domain system that is associated with the fault;
- signal the fault and an identifier for the originating domain to one or more internal units in the switch chip; and
- perform a clearing operation in one or more internal units that clears out all traffic for the originating domain without affecting the other domains of the multi-domain system, wherein, while performing the clearing operation, the switch chip is configured to:
  - invalidate all requests for cache lines for the originating domain that are queued at the switch chip; and
  - invalidate all packets queued at the switch chip that are destined for or originating from the originating domain.

16. The multi-domain system of claim 15, wherein signaling the fault and the identifier for the originating domain to one or more units in the switch chip further comprises:
- halting one or more single-domain units in the switch chip that are associated with the originating domain; and
- performing the clearing operation in one or more multi-domain units in the switch chip, wherein a multi-domain unit simultaneously handles traffic for multiple domains in the multi-domain system.

17. The multi-domain system of claim 16, wherein halting one or more single-domain units in the switch chip further comprises:
- halting one or more input queuing units (IQUs) that connect to processor chips that are associated with the originating domain;
- temporarily halting the input packet flow for one or more address switch receiving units (AXRIs) and address switch communicating units (AXCIs) during the clearing operation;
- halting output paths in one or more address switch output units (AXO) that connect to processor chips that are associated with the originating domain; and
- halting one or more output queuing units (OQUs) that connect to processor chips that are associated with the originating domain.

18. The multi-domain system of claim 17, wherein performing the clearing operation for one or more multi-domain units in the switch chip further comprises:
- invalidating all of the requests that are associated with the originating domain in one or more address serialization units (ASUs); and
- invalidating any queued packets that are associated with the originating domain from the one or more AXOs.

19. A non-transitory computer-readable storage medium storing instructions that when executed by a computer cause the computer to perform a method for performing physical domain error isolation and recovery in a multi-domain system, the method comprising:

in a switch chip that provides connectivity and cache-coherency support for two or more processor chips, determining a fault for the multi-domain system, wherein the multi-domain system comprises the processor chips and the switch chip, and wherein the processor chips are divided into two or more distinct domains;

determining an originating domain of the multi-domain system that is associated with the fault;

signaling the fault and an identifier for the originating domain to one or more units in the switch chip; and performing a clearing operation in one or more units of the switch chip that clears out all traffic for the originating domain without affecting the other domains of the multi-domain system, wherein performing the clearing operation comprises:
- invalidating all requests for cache lines for the originating domain that are queued at the switch chip; and
- invalidating all packets queued at the switch chip that are destined for or originating from the originating domain.

20. The method of claim 1, further comprising:

for each cache line in a set of cache lines:
- in response to determining, at a first processor chip of the processor chips, that a cache miss has occurred for the cache line, sending a request for the cache line from the first processor chip to the switch chip;
- at the switch chip, performing a lookup in a tag array stored at the switch chip to determine that the cache line is cached at a second processor chip of the processor chips; and
- storing, in a first buffer at the switch chip, a request for the second processor chip to send the cache line to the first processor chip;

sending, from the switch chip to the second processor chip, a subset of the requests in the first buffer; and receiving, at the switch chip from the second processor chip, a set of response packets to at least some of the requests in the subset, wherein, for each response packet in the set of response packets, receiving the response packet comprises storing, in a second buffer at the switch chip, the cache line for the request in the subset of requests that corresponds to the response packet, wherein invalidating all the requests comprises invalidating all of the requests for the second processor chip to send the cache line to the first processor chip that are stored in the first buffer, wherein invalidating all the packets comprises invalidating all of the cache lines that are stored in the second buffer, and wherein the switch chip is separate and distinct from the first processor chip, wherein the switch chip is separate and distinct from the second processor chip, and wherein the first processor chip is separate and distinct from the second processor chip.

* * * * *